E. STEPHENS.
TIMER FOR GAS ENGINES.
APPLICATION FILED MAR. 18, 1914.
1,125,600.
Patented Jan. 19, 1915.
2 SHEETS—SHEET 1.
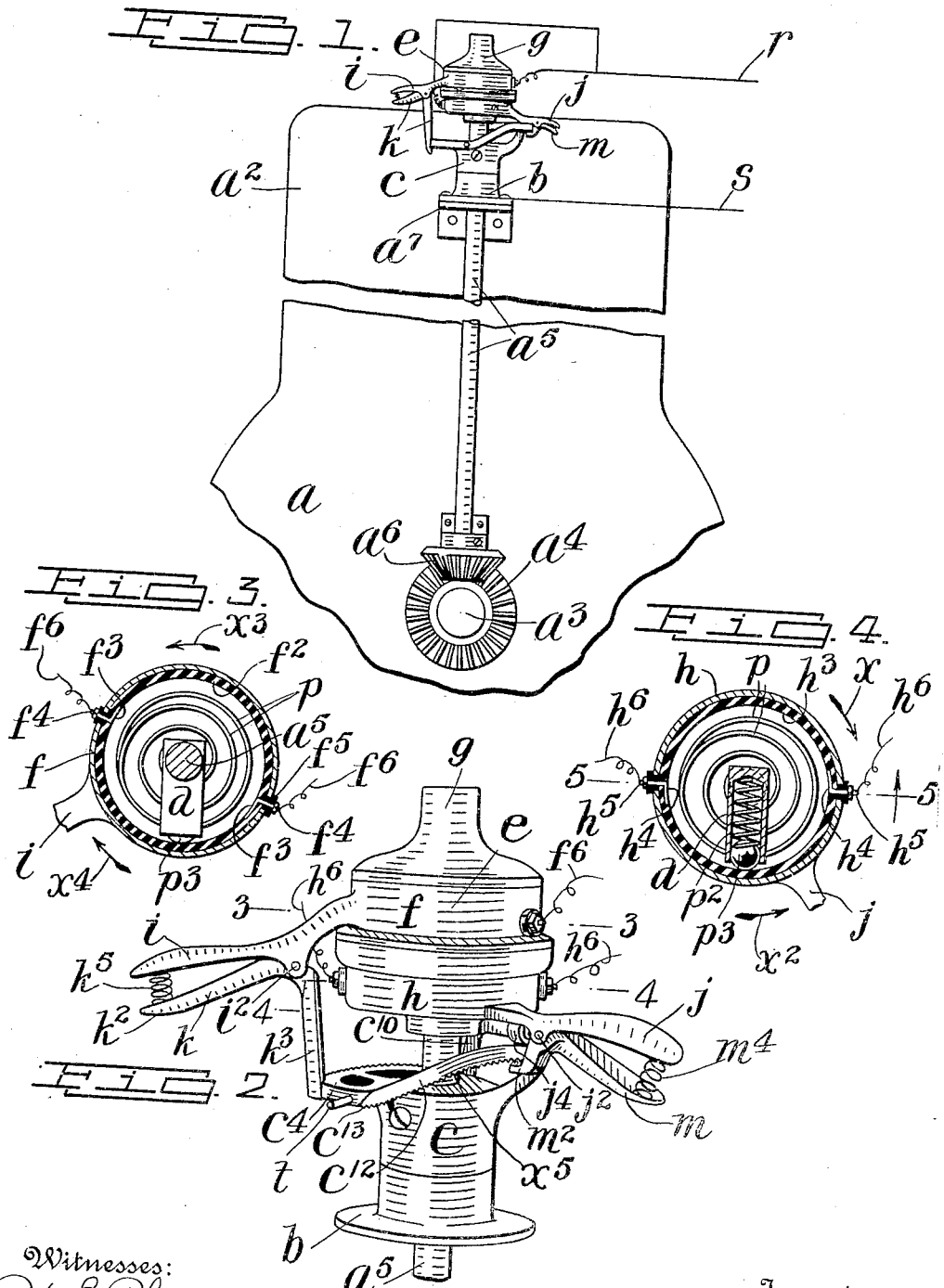
Witnesses:
H. E. Thompson
S. Andrews
Inventor
Emanuel Stephens
By his Attorneys
Edgar Tate & Co.

E. STEPHENS.
TIMER FOR GAS ENGINES.
APPLICATION FILED MAR. 18, 1914.
1,125,600.
Patented Jan. 19, 1915.
2 SHEETS—SHEET 2.
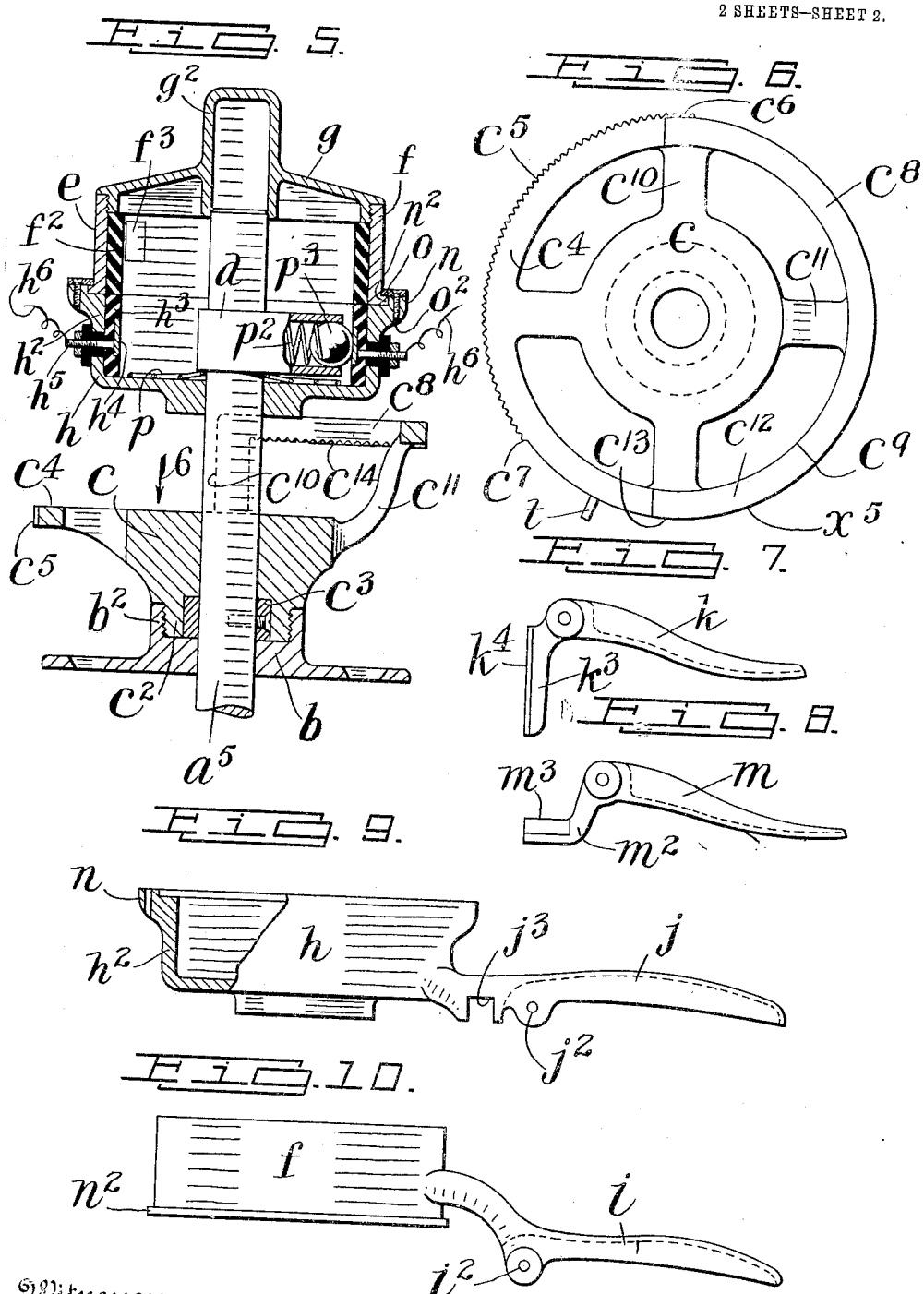
Witnesses:
H. E. Thompson
S. Andrews
Inventor
Emanuel Stephens,
By his Attorneys
Edgar Tate & Co.

UNITED STATES PATENT OFFICE.

EMANUEL STEPHENS, OF MOUNT VERNON, NEW YORK.

TIMER FOR GAS-ENGINES.

1,125,600.  Specification of Letters Patent.  Patented Jan. 19, 1915.

Application filed March 18, 1914. Serial No. 825,449.

*To all whom it may concern:*

Be it known that I, EMANUEL STEPHENS, a subject of the King of Greece, and residing at Mount Vernon, in the county of Westchester and State of New York, have invented certain new and useful Improvements in Timers for Gas-Engines, of which the following is a specification, such as will enable those skilled in the art to which it appertains to make and use the same.

This invention relates to what are known as timers, for gas engines, and the object thereof is to provide an improved device of this class particularly designed for use in connection with motor boat engines, and which is also designed for use as a reverser; a further object being to provide a device of the class specified which is simple in construction, efficient in operation, and which may be easily and conveniently manipulated in order to accomplish the desired result.

The invention is fully disclosed in the following specification, of which the accompanying drawings form a part, in which the separate parts of my improvement are designated by suitable reference characters in each of the views, and in which;—

Figure 1 is a view, in elevation, showing a part of the crank casing and the cylinder of a gas engine, and showing the manner of mounting my improvement in connection therewith; Fig. 2 a perspective detail view of my improved timer and reverser detached; Fig. 3 a partial section on the line 3—3 of Fig. 2; Fig. 4 a similar section on the line 4—4 of Fig. 2; Fig. 5 a section on the line 5—5 of Fig. 4, and also a vertical central section through the device, as shown in Fig. 2; Fig. 6 a plan view of the bottom portion or part of my improved timer and reverser, and looking in the direction of the arrow 6 of Fig. 5; Fig. 7 a side view of a crank arm which I employ, and which is shown in Figs. 1 and 2; Fig. 8 a similar view of another crank arm which I employ, and which is also shown in Figs. 1 and 2; Fig. 9 a side view partly in section, of the bottom part of a drum case which forms a part of my improvement, and which is shown in Figs. 1, 2, 4 and 5, and; Fig. 10 a side view of the top part of said drum case, and also shown in Figs. 1, 2, 3 and 5.

In the drawings forming part of this specification, I have shown at $a$ the crank case of an engine of the class specified, and indicated at $a^2$ the cylinder thereof, and at $a^3$ I have shown the crank shaft mounted in the crank case in the usual manner, and said crank shaft is provided with a beveled gear $a^4$, all these parts being old and well known and forming no part of my invention. I have also shown at $a^5$ the usual timer shaft mounted at right angles to the crank shaft and provided with a beveled gear $a^6$ which meshes with the gear $a^4$. The shaft $a^5$ passes through the bracket plate $a^7$ secured to the cylinder $a^2$, and on this bracket plate is secured a plate $b$ through which the shaft $a^5$ passes, and the plate $b$ is provided with a raised collar $b^2$, and mounted on the shaft $a^5$ above the plate $b$ is a block $c$ having a neck portion $c^2$ screwed into the collar $b^2$, and a bushing $c^3$ is placed in the neck $c^2$ of the block $c$ and secured to the shaft $a^5$, and this prevents any longitudinal or vertical movement of the shaft $a^5$.

One side of the block $c$ is provided at the top thereof with a semi-circular rim $c^4$ provided on its outer perimeter with teeth $c^5$ which extend approximately through an arc of 130°, or from the point $c^6$ to the point $c^7$, the other side of said block is provided with a raised semi-circular rim $c^8$ which extends approximately through an arc of 130°, or from the point $c^6$ to the point $c^9$, in Fig. 6, and the rim portion $c^8$ is connected at the end $c^6$ with the block $c$ by a radial and upwardly directed arm $c^{10}$, and at the distance of 90° from the point $c^6$, said rim portion $c^8$ is connected with the block $c$ by an upwardly and outwardly curved arm $c^{11}$, while the end of the rim portion $c^8$, opposite the point $c^6$, or at $c^9$ is connected with the block $c$ by a downwardly curved part $c^{12}$, and the bottom part of the rim portion $c^8$, from the point $c^6$ to the point $c^{13}$ is provided on its under side with teeth $c^{14}$, as clearly shown in Fig. 5.

The shaft $a^5$ is provided near the upper end thereof, or the end thereof opposite the crank shaft $a^5$, with a radial box member $d$ which may be formed integrally therewith, or be secured thereto, and this box member is inclosed by a drum casing $e$ loosely mounted on the shaft $a^5$ and inclosing the box member $d$ and vertically movable on said shaft.

The drum casing $e$ consists of a top member $f$ having a removable cap $g$ and a bottom member $h$ having a raised arm $h^2$ and the cap $g$ is provided with a central thimbleshaped hub member $g^2$ adapted to receive the end of the shaft $a^5$.

The top part $f$ of the drum casing $e$ is provided with an insulating lining $f^2$ having at opposite points and in its inner surface contact plates $f^3$ which are L-shaped in form, and parts of which pass downwardly through the drum member $f$ and serve as binding posts $f^4$ which are insulated from the part $f$ of the drum casing, as shown at $f^5$, and connected with the binding posts $f^4$ are the usual wires $f^6$.

The bottom part $h$ of the drum casing $e$, or the rim $h^2$ thereof, is provided with an insulating lining $h^3$, the inner surface of which is provided at opposite points with contact plates $h^4$ similar in all respects to the contact plates $f^3$, and these contact plates $h^4$ also form binding posts $h^5$ which pass outwardly through the rim $h^2$ of the part $h$, and with which the usual wires $h^6$ are connected.

The top drum member $f$ is provided at one side with a radial arm $i$, and the bottom drum member $h$ is provided with a radial arm $j$, and a crank arm $k$ is pivoted to the arm $i$ at $i^2$ and consists of a radial part $k^2$ and a vertically arranged part $k^3$ having a beveled edge $k^4$ which operates in connection with the teeth $c^5$ on the rim member $c^4$ of the block $c$, and between the arm $i$ and the part $k^2$ of the arm $k$ is placed a spring $k^5$.

The crank arm $m$ is pivoted to the arm $j$ at $j^2$, and said arm $m$ is provided with an L-shaped nose piece $m^2$ having a top beveled edge $m^3$ which operates in connection with the teeth $c^{14}$ on the rim member $c^8$ of the block $c$ and between the arms $j$ and $m$ is placed a spiral spring $m^4$.

The arm $j$ is provided inwardly of the pivot point $j^2$ of the arm $m$ with a recess $j^3$ in which is mounted a roller $j^4$ which bears on the top surface of the rim member $c^8$ of the block $c$ including the downwardly curved end part $c^{12}$ of said member, and the arm $j$ and the roller $j^4$ bearing on the rim member $c^8$ supports the drum casing $e$ comprising the parts $f$ and $h$.

The part $h$ of the drum casing $e$ is provided with a top flange $n$ and the part $f$ of said drum casing is provided with a bottom flange $n^2$ which is narrower than the flange $n$ and fits in a rabbet groove formed therein, as clearly shown in Fig. 5, and placed on said flanges $n$ and $n^2$ is a ring or band $o$ and screws or similar devices $o^2$ are passed downwardly through said ring or band and into or through the flange $n$, and this securely holds the top and bottom members of the drum casing $e$ together, while permitting each to rotate independent of the other within certain limits, and said ring or band $o$ is preferably made of two parts in order that it may be conveniently mounted on the drum member $f$, but these parts of said drum casing may be connected in any preferred manner, or by any means that will permit them to rotate independently of each other as above described.

Mounted below the radial box member $d$, or between said box member and the bottom part $h$ of the drum casing $e$ is a spiral spring $p$, and said box member $d$ is open at its outer end, and mounted therein is a spiral spring $p^2$ which bears on a contact ball $p^3$ placed in the end of said box member and which is adapted to make contact with the contact plates $h^4$ in the bottom drum casing member $h$, and also with the contact plates $f^3$ in the top drum casing member $f$.

The wires $f^6$ which connect with the top drum casing member $f$, or the binding posts $f^4$ thereof, are connected with the magneto wire $r$, shown in Fig. 1, as are also the wires $h^6$ which connect with the binding posts $h^5$ of the bottom member $h$ of the drum casing $e$, and the usual battery wire $s$ is also employed, and in the construction shown, is connected with the plate $b$, but this wire may be connected with any part of the apparatus, so that the battery current will pass through the shaft $a^5$.

The operation will be readily understood from the foregoing description, when taken in connection with the accompanying drawings and the following statement thereof.

In the position of the radial arms $i$ and $j$, as shown in Fig. 2, the timer is set at reverse slow speed, and the shaft $a^5$ is rotating in the direction of the arrow X of Fig. 4, and in order to increase said speed, the arms $j$ and $m$ are manipulated so as to rotate the drum member $h$ or the contacts $h^4$ thereof in the direction of the arrow $X^2$ of Fig. 4, thereby advancing the spark, as will be readily understood.

In order to turn the motor forwardly, the arms $j$ and $m$ are manipulated to bring them to the point $c^{13}$, or on a plane with the semi-circular rim $c^4$ of the block $c$. In this operation, the drum casing $e$, composed of the members $f$ and $h$ descends on the shaft $a^5$ to the same extent that the arms $j$ and $m$ descend from the point $c^9$ to the point $c^{13}$ on the raised semi-circular rim $c^8$. Immediately after the above operation, the shaft $a^5$ changes its direction and turns forward, or in the direction of the arrow $X^3$ in Fig. 3, and in order to increase the speed, the arms $i$ and $k$ are manipulated so as to rotate the drum member $f$ or the contacts $f^3$ thereof in the direction of the arrow $X^4$, Fig. 3, and this, as will be understood, will advance the spark.

In both of the above operations, the current through the wires $r$ and $s$ are completed while the ball $p^3$ makes contact with either of the contact pieces in the drum members $f$ and $h$, and, as will be understood, these contact pieces are so adjusted that the gases in each of the cylinders, which, with the construction shown, will be two in number, will be ignited at the proper time. When it is desired to stop the motor, the arms $j$ and $m$ are set centrally of the downwardly curved part $c^{12}$, or at a point $X^5$ in Fig. 2, in which position, the ball $p^3$ does not make contact with either of the contact pieces $f^3$ and $h^4$, and in order to start the motor from this position, in either the forward or reverse direction, the arms $j$ and $m$ must be either raised or lowered to the positions hereinbefore described. I also provide the rim member $c^4$ with a stop pin $t$ which will limit the forward movement of the crank arms $k$ and $m$, or the parts $k^3$ and $m^2$ thereof.

From the foregoing description it will be seen that the essential features of my invention comprise the block $c$ provided at one side with a semi-circular raised rim $c^8$, together with the vertically movable drum casing $e$, said parts being constructed and operating as shown and described, and while I have shown and described the preferred form of the various parts of my improvement, my invention is not limited to the details thereof, as herein shown and described, and changes in and modifications of the various parts of my improvement may be made, within the scope of the appended claims, without departing from the spirit of my invention or sacrificing its advantages.

Having fully described my invention what I claim as new and desire to secure by Letters Patent is:—

1. In a timer for gas engines, the combination with the timer shaft of a radially arranged spring contact device and a vertically movable drum casing mounted on said shaft and inclosing said contact device, said drum casing being composed of top and bottom parts independently rotatable, each of said parts being provided on its inner side with oppositely arranged contacts.

2. In a timer for gas engines, the combination with the timer shaft of a radially arranged spring contact device and a vertically movable drum casing mounted on said shaft and inclosing said contact device, said drum casing being composed of top and bottom parts independently rotatable, each of said parts being provided on its inner side with oppositely arranged contacts, and means for raising and lowering said casing on said shaft, and for rotating each of the parts thereof independently of the other.

3. A timer and reverser for gas engines comprising a shaft provided with a radially arranged spring operated contact device, a drum casing mounted on said shaft and inclosing said contact device and movable longitudinally of said shaft, said drum casing being composed of two parts independently rotatable and each of which is provided on its inner side with oppositely arranged contact devices, and means for moving said drum casing longitudinally of said shafts, and for rotating the separate parts thereof.

4. In an apparatus of the class described, a shaft provided with a radially arranged spring operated ball contact device, a drum casing movable longitudinally on said shaft and inclosing said contact devices, and composed of separate parts independently rotatable, and each of which is provided on its inner side with a contact device, and means for moving said drum casing longitudinally of said shaft, and for rotating the separate parts thereof in either direction.

5. In an apparatus of the class described, a shaft provided with a radially arranged spring operated contact device, a drum casing mounted on said shaft and movable longitudinally thereof and composed of separate independently rotatable parts provided with a plurality of contact devices, and means for moving said drum casing longitudinally of said shaft and for rotating the separate parts thereof independently.

6. In an apparatus of the class described, a shaft provided with a contact device, a member mounted on said shaft and movable longitudinally thereof, and composed of separate independently rotatable parts, said independently rotatable parts being each provided with a plurality of contact devices with which the contact device on the shaft is adapted to engage.

7. In an apparatus of the class described, a shaft provided with a contact device, a member mounted on said shaft and movable longitudinally thereof, and composed of separate independently rotatable parts, said independently rotatable parts being each provided with a plurality of contact devices with which the contact device on the shaft is adapted to engage, and means for moving said member longitudinally of said shaft and for independently rotating the separate parts thereof.

In testimony that I claim the foregoing as my invention I have signed my name in presence of the subscribing witnesses this 9th day of March, 1914.

EMANUEL STEPHENS.

Witnesses:
S. ANDREWS,
C. MULREANY.

Copies of this patent may be obtained for five cents each, by addressing the "Commissioner of Patents, Washington, D. C."